US005657970A

United States Patent [19]

Davis

[11] Patent Number: 5,657,970

[45] Date of Patent: Aug. 19, 1997

[54] PORTABLE OR FOLDAWAY WORKBENCH WITH A TOOL TRAY

[76] Inventor: Philip Nigel Davis, 48 The Oak Field, Cinderford, Gloucestershire, GL14 2DE, England

[21] Appl. No.: 512,624

[22] Filed: Aug. 8, 1995

[51] Int. Cl.[6] .......... B23Q 3/00

[52] U.S. Cl. .......... 269/16; 269/244; 269/901

[58] Field of Search .......... 269/16, 901, 139, 269/219, 220, 244, 279, 280, 281, 282, 283, 284; 108/25, 26, 65, 69

[56] References Cited

U.S. PATENT DOCUMENTS

| | | | |
|---|---|---|---|
| 601,386 | 3/1898 | Stephenson | 269/16 |
| 1,580,627 | 4/1926 | Peterson | 269/16 |
| 2,185,907 | 1/1940 | Alexander | 108/26 |
| 2,637,358 | 5/1953 | Larson | 269/16 |
| 2,872,259 | 2/1959 | Thorpe | 108/69 |
| 2,942,921 | 6/1960 | Rachman et al. | 108/26 |
| 3,233,940 | 2/1966 | Tooley, Jr. | 108/25 |
| 4,085,686 | 4/1978 | Turner et al. | 108/25 |
| 4,155,386 | 5/1979 | Alessio . | |
| 4,167,264 | 9/1979 | Kretzmeir | 269/16 |
| 4,261,555 | 4/1981 | Adams | 269/16 |
| 4,276,955 | 7/1981 | Hickman | 269/244 |
| 4,303,158 | 12/1981 | Perkins . | |
| 4,333,638 | 6/1982 | Gillotti | 269/901 |
| 4,366,998 | 1/1983 | Kaiser . | |
| 4,378,828 | 4/1983 | Shiminski . | |
| 4,596,308 | 6/1986 | Auerbach . | |
| 5,113,920 | 5/1992 | Sedeniussen | 269/901 |
| 5,232,035 | 8/1993 | Adams, Jr. . | |

FOREIGN PATENT DOCUMENTS

| | | |
|---|---|---|
| 2063111 | 6/1981 | United Kingdom . |
| 2 262 085 | 6/1993 | United Kingdom . |

*Primary Examiner*—Robert C. Watson
*Assistant Examiner*—Thomas W. Lynch
*Attorney, Agent, or Firm*—Young & Thompson

[57] ABSTRACT

A portable or fold away workbench comprises a pair of elongate vise members which are supported from below and which are relatively movable towards and away from one another and a tool tray forming part of, or being attached to, one of the vice members. The tool tray includes a well for storing relatively large tools and a plurality of depressions, which are shallower than the well, for storing relatively small tools.

1 Claim, 3 Drawing Sheets

PORTABLE OR FOLDAWAY WORKBENCH WITH A TOOL TRAY

INTRODUCTION

This invention relates to a portable or fold away workbench.

SUMMARY OF THE INVENTION

According to the present invention there is provided a portable or fold away workbench comprising a pair of elongate vise members which are supported from below and which are relatively movable towards and away from one another and a tool tray forming part of, or being attached to, one of the vise members, the tool tray including means for holding tools so that they are readily to hand.

The invention will now be more particularly described by way of example with reference to the accompanying drawings.

DESCRIPTION OF THE PREFERRED EMBODIMENT

Figure 1:
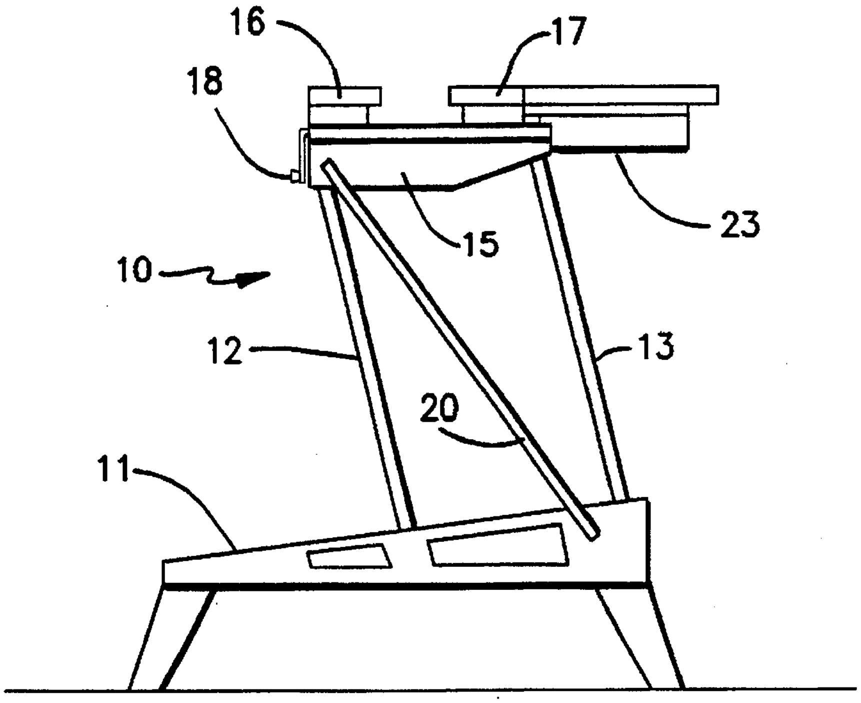
FIG. 1 is an end view of one embodiment of a workbench according to the present invention.
Figure 2:
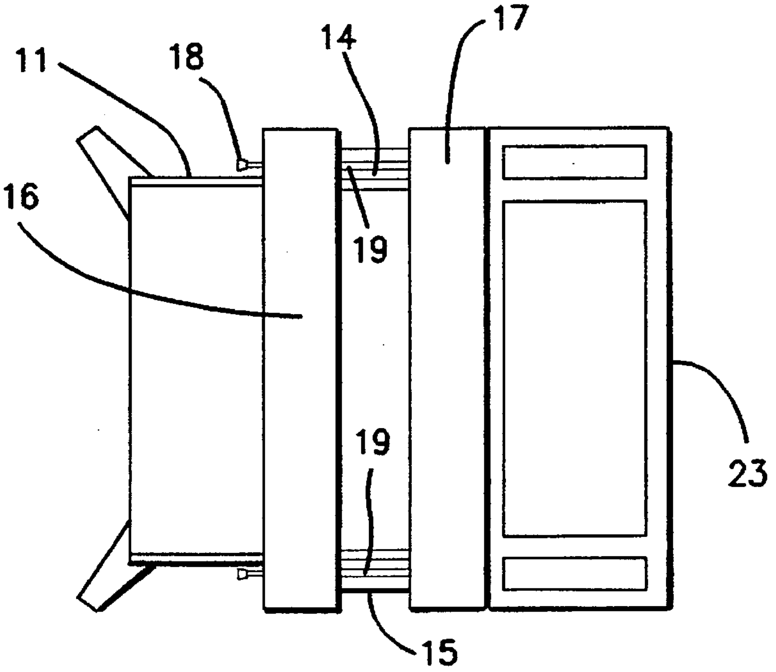
FIG. 2 is a plan view of the workbench shown in FIG. 1
Figure 3:
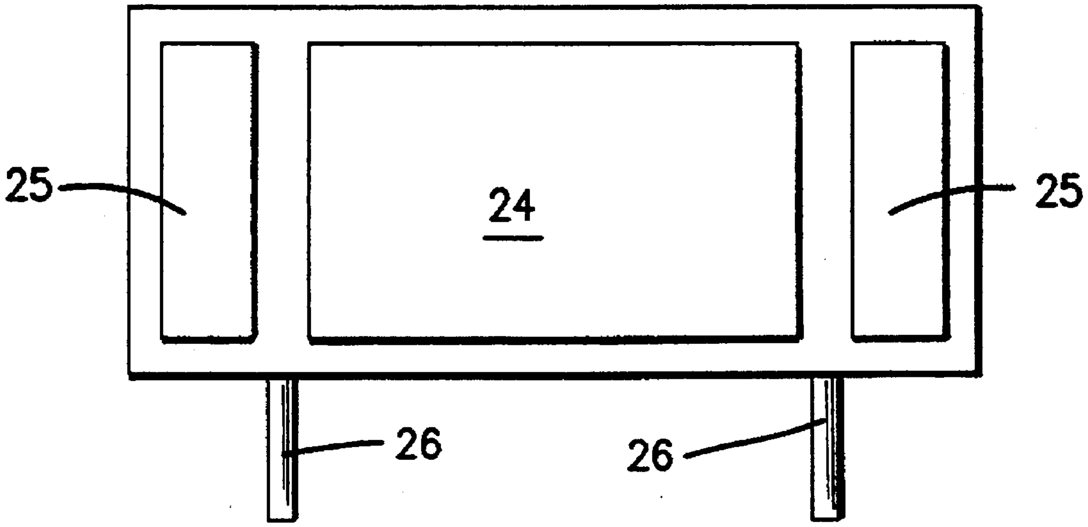
FIG. 3 is a plan view of the tool tray of the workbench shown in FIG. 1
Figure 4:
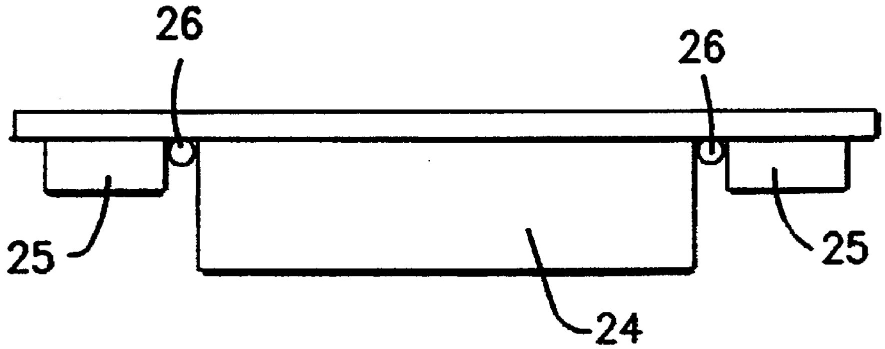
FIG. 4 is a side view of the tool tray shown in FIG. 3.
Figure 5:
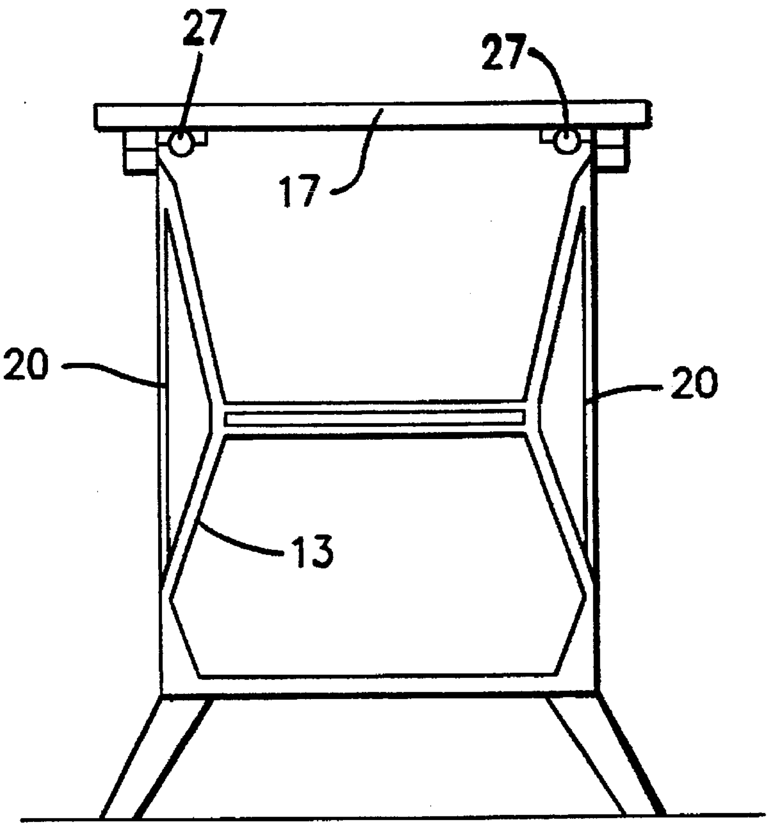
FIG. 5 is a side view of the workbench with the tool tray removed.
Figure 6:
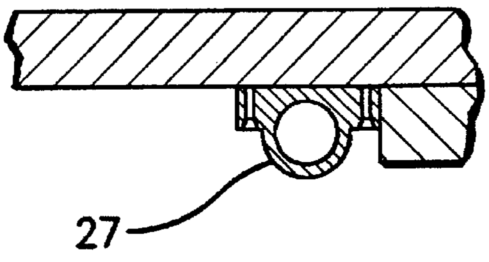
FIG. 6 is a detailed cross section showing a bearer fixed to the workbench for supporting the tool tray.

Referring to the drawings, there is shown therein a workbench 10 comprising a base structure 11, two frame members 12 and 13 pivotably connected to the base structure for movement in the manner of a parallelogram between an operative position as shown in FIGS. 1 and 5 and a storage position in which the frame members 12 and 13 lie closely adjacent to the base structure 11.

The frame members 12 and 13 are pivotably connected at one end to a vise support 14 and at the opposite end to a similar vise support 15. The workbench also includes two elongate vise members 16 and 17 which extend transversely between the two vise supports 14 and 15 and which have upper surfaces which are coplanar or substantially coplanar to define a work surface when the workbench is in its operative position.

The vise member 16 is secured to the two supports 14 and 15, but the vise member 17 is movable towards and away from the vise member 16 along the upper surfaces of the supports 14 and 15 by crank handles 18 which rotate externally threaded spindles 19 co-operating with internally threaded nuts (not shown) connected to the lower end of the vise member 17. The nuts are connected to the lower end of the vise member 17 for pivotable movement about respective vertical axes. This allows the threaded spindles 19 to be rotated independently so that the gap between the vise members 16 and 17 at one end thereof can be different from the gap at the other end thereof.

The workbench also includes a pair of brace members 20 connected between respective vise supports 14 and 15 and the base structure 11 for releasably supporting the workbench in its operative position.

The workbench of the type hereinbefore described is well known and has been sold for many years under the Registered Trademark WORKMATE. It is described fully, for example, in GB 1267032.

In accordance with the present invention, the workbench also includes a tool tray 23 forming part of, or being attached to, one of the vise members.

In the embodiment shown, the tool tray 23 is releasably attachable to the vise member 17. The tool tray is typically moulded in plastic material and includes a well 24 for storing large tools and depressions 25, which are shallower than the well 24, for storing small tools, fixings such as screws etc. The tool tray 23 may also be provided with any combination of apertures, slots and/or hooks for the precise location of screwdrivers, saws, chisels etc.

Two support arms 26 are secured to the underside of the tool tray and these are slidably received in bearers 27, respectively, which are permanently attached, using screws, bolts or the like, to the underside of the vise member 17. The support arms 26 can then be releasably fastened to the bearers 27 by clips, catches, bolts or similar means.

The upper surface of the tool tray 23 is arranged to be no higher than the upper surface of the vise members 16 and 17 when the tool tray is secured in position.

In an alternative embodiment, the vise member 17 could be replaced by a vise member including an integral tool tray.

The tool tray can be used with other portable or fold away workbenches which are variations on or derivatives of, the workbench described above and which have a pair of elongate vise members which are supported from below and which are relatively movable towards and away from one another by two independently operable vise operating members.

What I claim is:

1. In a portable or fold away workbench comprising a pair of elongate vise members which are supported from below and which are relatively movable towards and away from one another and a tool tray removably secured to one of the vise members, the tool tray including means for holding tools; the improvement wherein said means for holding tools comprises three wells in said tool tray, there being a central well and two wells on opposite sides of said central well, the tool tray having two support arms which are slidable in bearers on said one vise member, one of said support arms being disposed between said central well and one of said two wells and the other of said support arms being disposed between said central well and the other of said two wells.

* * * * *